(No Model.)
E. G. BALLARD.
ACTINOMETER.
No. 445,743.                    Patented Feb. 3, 1891.
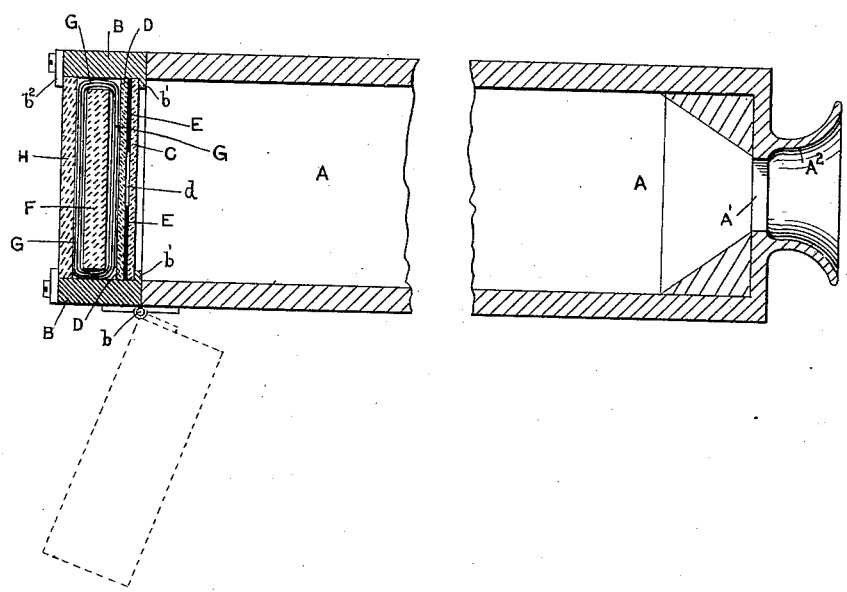
Witnesses
James F. Duhamel
Horace H. Dodge.
Edward George Ballard,
Inventor,
by Dodge Sons,
his Attys.

UNITED STATES PATENT OFFICE.

EDWARD GEO. BALLARD, OF CHESTER, ENGLAND.

ACTINOMETER.

SPECIFICATION forming part of Letters Patent No. 445,743, dated February 3, 1891.

Application filed August 18, 1890. Serial No. 362,281. (No model.)

*To all whom it may concern:*

Be it known that I, EDWARD GEORGE BALLARD, inspector of alkali-works, a subject of the Queen of Great Britain, residing at Chester, in the county of Chester, in the Kingdom of Great Britain, have invented certain new and useful Improvements in Actinometers, of which the following is a specification.

This invention relates to improvements in the method of and instruments for measuring the relative intensity of the actinic rays present or reflected from any object or landscape at different times or under different atmospheric or other conditions.

A ready method of and simple instrument for measuring the relative intensity of such actinic rays has long been a great desideratum, especially by photographers. Various instruments have from time to time been brought before the public with the object of supplying this want; but none of them have, as far as I am aware, proved very satisfactory. The same may be said of the various tables, which are mainly based upon data obtained by experimenters with their respective instruments. Some of such tables in the form of instruments have been complicated in construction and tedious to manipulate, and most of them, although of great assistance in open landscape, have this drawback, that, in situations where the quality of the light is interfered with by the various-colored mediums through which it passes—as, for example, in forest scenery, deep glens with overhanging trees, interiors of churches, (especially those having stained-glass windows,) &c.—the duration of the requisite exposure becomes after all very much a matter of guesswork.

The object of my present improvements as applied to photography is to furnish a simple and reliable instrument adapted to measure rapidly the relative intensity of the actinic rays which are reflected from the object or landscape at any given time and under any conditions, atmospheric or otherwise, existent thereat.

The principles upon which the instrument is constructed are mainly based upon the following data: First, certain luminous or phosphorescent substances—such as luminous calcium sulphide, commercially known as "Balmain's luminous paint"—are excited by and emit only the actinic rays of light which act upon photographic plates—that is, the blue or violet rays; second, when such luminous substances are exposed to the light for a comparatively short time a point of maximum intensity of luminosity appears to be attained, which cannot be exceeded either by extending the period of exposure or by increasing the intensity of the light; third, when such luminous substances are excited, as above described, and the light suddenly cut off from them, the bluish rays emitted therefrom gradually fade.

The rate at which this fading takes place is employed by me in this invention (when applied as an aid to photography) as a means for ascertaining at any given time and under any conditions thereat existing the relative intensity of the actinic rays reflected from any given object or landscape with a view to determine exactly what length of exposure it is necessary to give to a photographic plate of a specified type directed toward such object or landscape at approximately the same time and practically under the same conditions. The length of exposure necessary for the plate is determined by first noting (either by clock-work or otherwise) the time required for the luminosity of the excited material in the instrument to fade from its maximum intensity to that of a portion of the actinic rays which are reflected from the object or landscape and pass by preference through an obstructive medium, so as to enter the interior of the instrument at a reduced intensity, and, secondly, by referring the time so noted to a specially-constructed table for the purpose of ascertaining the exact amount of exposure required for the type of plate to be employed.

The accompanying drawing shows in longitudinal section one form of instrument constructed in accordance with my invention and giving very good results.

A is an opaque tube or chamber of any convenient size and shape, having its interior of a dull-black color. One end of the tube is provided with a sighting-orifice A' and by preference with an eye-piece $A^2$.

On the opposite end of the tube A a similar, but shorter, tube or frame B is mounted in such a movable manner that one end of it may alternately be exposed to the light (either artificial or natural) and presented to the darkened interior of the tube A. To this end the frame B may be conveniently hinged to the tube A, as at $b$, so that it forms a kind of lid thereto.

The frame B is glazed at its rear end—that is, the end next the tube A—with a piece of ground glass C. In front of this is a piece of transparent glass D, having a portion of its rear surface (say half its area) covered with an opaque layer E of luminous calcium sulphide or its luminous equivalent. If the luminous material is not sufficiently opaque in itself, a corresponding opaque backing may be applied on either side of the glass D. The remainder of the glass—as, for instance, a circular space $d$ in the center thereof—is left transparent; or in lieu of the glass D the luminous material may be supported upon a backing of opaque material, such as cardboard, having its center or other suitable portion cut away for the admission of the external actinic rays into the tube A; or the luminous material with an opaque backing may even be applied directly to the forward face of the adjacent ground glass C.

Behind the glass backing D is a piece of blue glass F, which is capable of cutting off all the rays entering the tube A from the exterior, except the actinic rays corresponding in color to those emitted by the luminous material E. The kind of glass which I have found to give very good results has a composition very similar to ordinary cobalt glass, with the addition, however, of a little oxide of copper. On one or both sides of the blue glass F is placed a series of layers G of a uniformly translucent material—such, for example, as tissue-paper.

The paper may be conveniently wrapped round the glass, as shown. This paper serves to lessen the intensity of the rays passing through the unobstructed portion of the glass backing D to such a degree as is necessary to give correct results with the instrument. The required degree of obscurity is constant for each type or variety of photographic plate. It is found in each case by actual experiment with the instrument and is regulated by the number of layers or folds of the paper G.

H is a plate of plain or ground glass placed in front of the tissue-paper and blue glass as a protection. The parts C E D G F H may be arranged to close one against the other within the frame B and may be held therein by the shoulder $b'$ and removable lugs or other suitable fastening devices $b^2$. In cases where it is difficult to obtain blue glass of exactly the right color a second piece of blue glass may be placed in the rear of the luminous material E, in order that the rays passing through the first blue glass F and those emitted from the material E may appear to the user to be of approximately the same color.

The mode of operation is as follows: The hinged frame B is opened, as shown in dotted lines, so that the luminous material is fully exposed to light (whether natural or artificial) for a period sufficient to excite it to the maximum degree—say for thirty seconds in ordinary cases. The eye is then placed against the eye-piece $A^2$, the instrument is directed toward the object to be photographed, and the hinged part B quickly closed. There will then be visible to the user a blue luminous ground surrounding a darker spot. Immediately on closing the frame B the user begins to count or notes on a suitable chronometer the number of seconds which it takes for the blue luminous portion to acquire the same tone as the darker central portion—that is, he notes how long it takes for the difference in the tones of the two portions to disappear and the whole surface to become of a uniform tone. The user now refers to his table, and in line with the number of seconds so noted on the instrument he finds the correct exposure to be given to a photographic plate of the type to which the instrument is adjusted.

The actinometer can easily be adjusted so as to give correct readings for plates of any degree of sensitiveness by removing one or more folds or layers of tissue-paper G or by adding thereto, or the translucency of the paper may be kept constant, so as to give correct results for one variety of plate, and the table may set forth the necessary allowance to be made to obtain correct results with other varieties of plates. The particular instrument employed by me is adjusted to plates of about 18 Warnerke's sensitometer value working with a stop or diaphragm in the lens of one-sixteenth of the focus of the same, commonly known as $\frac{f}{16}$.

It will be obvious that the instrument is not limited in its application to photography, as it may be employed in many other cases where the relative intensity of actinic rays is to be ascertained. Also, in some cases the instrument may be successfully used without the employment of an obstructive medium, such as G. Also, in cases where the actinic rays alone are present the blue medium F may be dispensed with. Moreover, a simple medium having the proper color and degree of translucency could be employed instead of the compound medium F G. As examples, I may mention bluish tissue-paper and blue ground glass.

I am aware that an actinometer has been proposed in which a disk having a series of numbered and graded covered openings was designed to be used in connection with a luminous disk which had previously had an area exposed equal to the size of the openings in the graded disk, one of said parts rotating upon the other, and to such a construction and arrangement I make no claim.

I declare that what I claim is—

1. The method of measuring the relative intensity of the actinic rays of light present at any given time or place or under any conditions, which consists in causing a portion of such rays at a suitable intensity to be viewed in juxtaposition to rays of approximately the same color emitted from a layer of fully-excited luminous material, and in noting the time taken by the said emitted rays to fade to the intensity of the said first-named rays, substantially as described.

2. The method of measuring the relative intensity of the actinic rays of light present at any given time or place or under any conditions, which consists in permitting a portion of the light to pass through a suitably-colored semi-transparent medium for the purpose of separating the actinic rays required and reducing their intensity to a sufficient extent, in viewing such rays in juxtaposition to rays of approximately the same color emitted from a layer of fully-excited luminous material, and in noting the time taken by the said emitted rays to fade from their maximum intensity to that of the said rays of reduced intensity, substantially as described.

3. The method of measuring the relative intensity of the actinic rays reflected from an object or landscape, the said method consisting in first permitting a portion of such actinic rays to enter a darkened chamber through a medium whereby their intensity is reduced sufficiently to give correct results, and in then comparing the intensity of said rays with that of the rays emitted from a gradually-fading luminous surface of the kind described visible within said chamber, substantially as described.

4. The method of ascertaining the proper amount of exposure to be given to a photographic plate at any given time and under any conditions existent thereat, the said method consisting in, first, exposing a layer of luminous material of the kind described to the light until fully excited; second, cutting off the light therefrom; third, noting the time taken for the actinic rays emitted from such excited material to fade from their maximum intensity to that of a portion of the actinic rays reflected from the object to be photographed and viewed at a suitable intensity in juxtaposition to the rays emitted from the luminous material, and, fourth, referring the time so noted to a properly-constructed table on which is set forth the equivalent amount of exposure to be given to the plate, substantially as described.

5. In an apparatus for measuring the relative intensity of actinic rays of light, the combination of a darkened chamber into which such actinic rays enter with a surface of self-luminous material such as described, capable of emitting rays in the dark after exposure of approximately the same color as said actinic rays, substantially as and for the purpose described.

6. In an actinometer, the combination of a darkened chamber having a sighting-orifice at one end, a layer of luminous material of the kind described located at the opposite end of said chamber, a device located beyond said luminous material and adapted to permit only the passage of rays of substantially the same wave-length as those of the luminous material into the interior of the chamber, means whereby such rays may be viewed in juxtaposition to the rays emitted from the luminous material, and means for alternately exposing said material to the light and cutting off the light therefrom, substantially as described.

7. In an actinometer, the combination of a darkened chamber having a sighting-orifice, an opaque layer of luminous material of the kind described arranged opposite said orifice in juxtaposition to a space adapted to permit the entrance of external rays into the chamber, a suitably-colored transparent medium located beyond said space and exposed to the external light, means for reducing the intensity of the rays passing through said space, and a device whereby the luminous material may be alternately exposed to and cut off from the light, substantially as described.

8. In an actinometer, the combination, with a darkened chamber A, having a sighting-orifice A′, of a layer E of luminous material opposite said orifice, a backing D for said layer, having a central space $d$, adapted to permit the passage of the external rays, a bluish-colored transparent medium F beyond said space, and a frame B, carrying said medium, backing, and layer and hinged to the chamber A, substantially as described.

9. The combination, with the chamber A, having eye-piece $A^2$, of the ground-glass plate C, glass backing D, opaque layer of luminous material E, having central opening, as described, blue-glass plate F, and hinged frame B, inclosing said plates, backing, and layer, substantially as described.

10. In an actinometer, the chamber A, having eye-piece $A^2$, layer of luminous material E, backing D, having unobstructed space $d$, blue-glass plate F, and hinged supporting-frame B, in combination with an adjustable device for reducing the intensity of the rays prior to their passage through such unobstructed space, substantially as described.

11. The combination, with the chamber A, having eye-piece $A^2$, of the ground-glass plate C, glass backing D, opaque layer of luminous material E, having central opening, as described, blue-glass plate F, variable series of layers of tissue-paper G, glass protecting-plate H, and hinged supporting-frame B, substantially as described.

12. In an actinometer, the combination, with a darkened chamber A, having a sighting-orifice A′, of an opaque layer of luminous material of the kind described located opposite said orifice in juxtaposition to a space adapted to permit the passage of the actinic rays into said chamber, whereby said rays may be viewed in juxtaposition to the rays emitted from the luminous material, substantially as and for the purpose described.

13. The combination of the chamber A, eye-piece A², backing D, having unobstructed space d, and layer of luminous material E, substantially as and for the purpose described.

14. The chamber A, eye-piece A², backing D, having unobstructed space d, and layer of luminous material E, in combination with an adjustable device for reducing the intensity of the actinic rays prior to their passage through said unobstructed space, substantially as described.

15. The darkened chamber A, having eye-piece A², in combination with the ground glass C, luminous layer E, having central opening, backing D, having unobstructed space d registering with said opening, layers of tissue-paper G, blue glass F, and protecting-glass H, all superposed within a frame B, hinged to and forming a continuation of said chamber A at the end opposite the eye-piece A², substantially as described.

16. In an actinometer, a disk of opaque luminous material of the kind described located within a darkened chamber opposite to a sighting-orifice, and having a central unobstructed space for the passage of the actinic rays into said chamber, substantially as and for the purpose described.

17. In an actinometer, the combination, with a darkened chamber having a sighting-orifice at one end and at the opposite end an unobstructed space for the entrance of the actinic rays, of a blue-colored transparent medium F, located beyond said space, and a strip of tissue-paper G of variable length enwrapping said medium, whereby the actinic rays are separated and their intensity reduced to the required degree, substantially as and for the purposes described.

18. The chamber A, having sighting-orifice A', opaque layer E of luminous gradually-fading material, having a central unobstructed space, blue transparent medium F, translucent medium G, and means for alternately exposing said luminous material to the light and presenting it to the sighting-orifice of the darkened chamber, as described, in combination with a specially-constructed table setting forth the various amounts of photographic exposure corresponding, respectively, with the various readings of the instrument, substantially as described.

19. In an actinometer, the combination of the luminous calcium-sulphide surface, and the blue glass colored by a mixture of oxides of cobalt and copper, and passing rays of almost identically the same wave-length as those emitted from the calcium-sulphide pigment.

In testimony whereof I have signed my name to this specification in the presence of two subscribing witnesses.

EDWARD GEO. BALLARD.

Witnesses:
WM. P. THOMPSON,
GEO. C. DYMOND.